(12) United States Patent
Woolsey et al.

(10) Patent No.: US 11,874,152 B2
(45) Date of Patent: Jan. 16, 2024

(54) GAS BYPASS METER SYSTEM

(71) Applicant: Sensia LLC, Houston, TX (US)

(72) Inventors: Kelly Woolsey, Calgary (CA); Benigno Segundo Montilla Jimenez, Muscat (OM); Matthias Maier, Dollard-des-Ormeaux (CA)

(73) Assignee: Sensia LLC, Houston, TX (US)

( * ) Notice: Subject to any disclaimer, the term of this patent is extended or adjusted under 35 U.S.C. 154(b) by 65 days.

(21) Appl. No.: 16/646,524

(22) PCT Filed: Sep. 11, 2018

(86) PCT No.: PCT/US2018/050436
§ 371 (c)(1),
(2) Date: Mar. 11, 2020

(87) PCT Pub. No.: WO2019/055403
PCT Pub. Date: Mar. 21, 2019

(65) Prior Publication Data
US 2020/0300681 A1    Sep. 24, 2020

Related U.S. Application Data

(60) Provisional application No. 62/557,527, filed on Sep. 12, 2017.

(51) Int. Cl.
*G01F 15/08*    (2006.01)
*G01F 1/36*    (2006.01)
(Continued)

(52) U.S. Cl.
CPC .............. *G01F 15/08* (2013.01); *G01F 1/363* (2013.01); *G01F 1/40* (2013.01); *G01F 1/74* (2013.01); *F16L 41/008* (2013.01)

(58) Field of Classification Search
CPC ................................ F16D 1/005; F16L 41/008
See application file for complete search history.

(56) References Cited

U.S. PATENT DOCUMENTS 2,392,711 A * 1/1946 Willenborg ............... F01N 5/00
60/281
2,688,985 A * 9/1954 Holdenried ............... G01F 1/42
138/44

(Continued)

FOREIGN PATENT DOCUMENTS

WO    WO-89/02066 A1    3/1989
WO    WO-93/18373 A1    9/1993

OTHER PUBLICATIONS

International Search Report and Written Opinion issued on PCT/US2018/050436 dated Jan. 2, 2019. 14 pages.

(Continued)

*Primary Examiner* — Justin N Olamit
(74) *Attorney, Agent, or Firm* — Foley & Lardner LLP

(57) ABSTRACT

A technique facilitates fluid flow measurement by providing a meter able to accurately monitor fluid flow of a liquid even if gas is present in the liquid. The meter may comprise a tubing with an internal flow passage and a wedge or other restriction extending into the internal flow passage. A first port is located upstream of the restriction and a second port is located downstream of the restriction to enable monitoring of a differential pressure across the restriction. The differential pressure can be used to determine the desired flow parameter, e.g. volumetric flow. The system facilitates separation of gas from the liquid and utilizes a gas bypass. The gas bypass routes the separated gas past the restriction, e.g. wedge, before directing the gas back into the fluid flow path.

20 Claims, 3 Drawing Sheets

(51) Int. Cl.
    *G01F 1/40*         (2006.01)
    *G01F 1/74*         (2006.01)
    *F16L 41/00*       (2006.01)

(56) References Cited

U.S. PATENT DOCUMENTS

| | | | | |
|---|---|---|---|---|
| 4,760,742 A * | 8/1988 | Hatton | ............ | F17D 3/00 |
| | | | | 73/861.04 |
| 5,495,872 A * | 3/1996 | Gallagher | ............ | F15D 1/025 |
| | | | | 138/40 |
| 5,589,642 A * | 12/1996 | Agar | ............ | G01F 1/74 |
| | | | | 73/861.04 |
| 5,741,977 A | 4/1998 | Agar et al. | | |
| 6,672,173 B2 * | 1/2004 | Bell | ............ | G01F 1/40 |
| | | | | 73/861.52 |
| 7,661,302 B2 * | 2/2010 | Gysling | ............ | G01N 33/26 |
| | | | | 73/200 |
| 8,548,753 B2 | 10/2013 | Rogers et al. | | |
| 9,625,293 B2 * | 4/2017 | Sawchuk | ............ | G01F 15/00 |
| 2007/0006640 A1 | 1/2007 | Gysling | | |
| 2007/0006727 A1 | 1/2007 | Gysling | | |
| 2014/0299210 A1 | 10/2014 | Atherton | | |

OTHER PUBLICATIONS

EP Search Report on EP Appl. Ser. No. 18856826.5 dated May 21, 2021 (7 pages).
CN Office Action on CN Appl. Ser. No. 201880066714.9 dated May 30, 2022, with translation (24 pages).
CN Office Action on CN Appl. Ser. No. 201880066714.9 dated Oct. 9, 2022, with translation (19 pages).

\* cited by examiner

GAS BYPASS METER SYSTEM

CROSS-REFERENCE TO RELATED APPLICATION

The present application is a 371 U.S. National Application of International Application No. PCT/US2018/050436, filed Sep. 11, 2018, which claims the benefit of and priority to U.S. Provisional Application Ser. No. 62/557,527, filed Sep. 12, 2017, both of which are incorporated herein by reference in their entirety.

BACKGROUND

In a variety of applications, wedge meters are used to provide flow measurements with respect to a fluid flowing through the meter. A wedge meter has a tubular flow body and a smooth wedge-shaped restriction in the tubular flow body to create a pressure drop as fluid flows past the restriction. Wedge meters may be used to establish and measure differential pressures in gases, steam, or liquids, including highly viscous liquids. However, wedge meters tend to provide unreliable, e.g. erratic, measurements when mixed fluids flow through the tubular flow body. For example, wedge meters tend to provide erratic measurements regarding flow of liquids mixed with gas. Sufficient gas void fractions (GVFs) in the fluid can substantially affect the accuracy of the wedge meter.

SUMMARY

In general, a system and methodology provide a meter for accurately monitoring fluid flow of a liquid even if gas is present in the liquid. The meter system may comprise a tubing with an internal flow passage and a wedge or other restriction extending into the internal flow passage. A first port may be located upstream of the restriction and a second port may be located downstream of the restriction to enable monitoring of a differential pressure across the restriction. The differential pressure can be used to determine the desired flow parameter, e.g. volumetric flow. The system facilitates separation of gas from the liquid and utilizes a gas bypass. The gas bypass routes the separated gas past the restriction, e.g. wedge, before directing the gas back into the fluid flow path.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
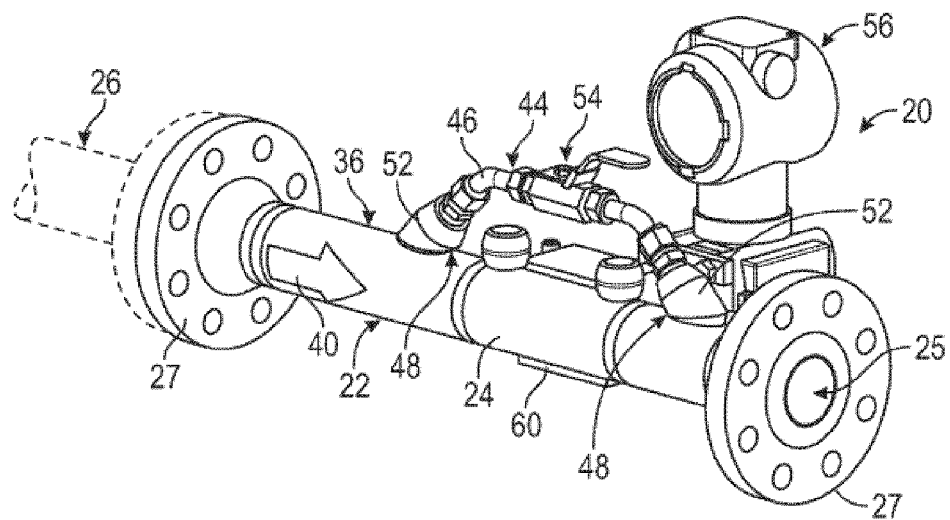
FIG. 1 is an orthogonal view of an example of a gas bypass meter system, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The present disclosure generally relates to a system and methodology for facilitating a more accurate monitoring of flowing liquid even if gas is present in the liquid. The system and methodology utilize a meter system which may be used in a variety of well related applications and other fluid flow applications. By way of example, the meter system may be used in oil and gas industry applications to measure flows of liquid produced by a progressive cavity pumping system, electric submersible pumping system, or other pumping system used to pump oil up through a wellhead.

According to an embodiment, the system utilizes a meter having a tubing with an internal flow passage and a wedge or other restriction extending into the internal flow passage. The restriction/wedge creates a reduction in the flow area within the internal flow passage and thus establishes a differential pressure between the regions upstream and downstream of the restriction. The meter may further comprise a first port located upstream of the restriction and a second port located downstream of the restriction to enable monitoring of the differential pressure.

This differential pressure can then be used to determine the desired flow parameter, e.g. volumetric flow. For example, wedge type restrictions may be used to create a differential pressure which can be correlated with volumetric flow. In some embodiments, the differential pressure may be correlated with a volumetric flow rate of the liquid by utilizing standard flow equations. However, calibration curves also may be used in determining correspondence between the differential pressure measured across the restriction/wedge and the volume flow rate. In some applications, the differential pressure created by the restriction can be correlated with a mass flow rate or with other flow parameters of the liquid.

To reduce inaccuracies which may result from gas mixed within the liquid, the system is constructed to facilitate separation of gas from the liquid and to then route the gas past the restriction. According to an embodiment, a gas bypass may be used to route the separated gas from the internal flow passage and past the restriction, e.g. wedge, before directing the gas back into the fluid flow path. By way of example, the separation of gas may be encouraged by a flow straightening section or other suitable gas separation section. The gas bypass routes gas past the restriction/wedge and may comprise a conduit coupled to the tubing upstream and downstream of the restriction/wedge. Additionally, various types of differential pressure monitors/transmitters may be coupled with the first and second ports to enable continued monitoring of the differential pressure across the restriction.

Referring generally to FIG. 1, an embodiment of a gas bypass meter system 20 is illustrated. In this example, the gas bypass meter system 20 comprises a meter 22 which will be described as a wedge meter for purposes of explanation. However, the wedge meter 22 may utilize various styles of restrictions which have wedge shapes or other types of shapes able to establish a suitable differential pressure. In the illustrated example, the wedge meter 22 comprises a tubing 24 having an internal flow passage 25. The wedge meter 22 is constructed for coupling into a variety of fluid flowing systems, such as a well system 26. By way of example, the wedge meter 22 may comprise connectors 27, e.g. flange connectors or other suitable connectors, by which the tubing 24 may be coupled into a fluid flow path of the well system 26 or other fluid flow system.

Figure 2:
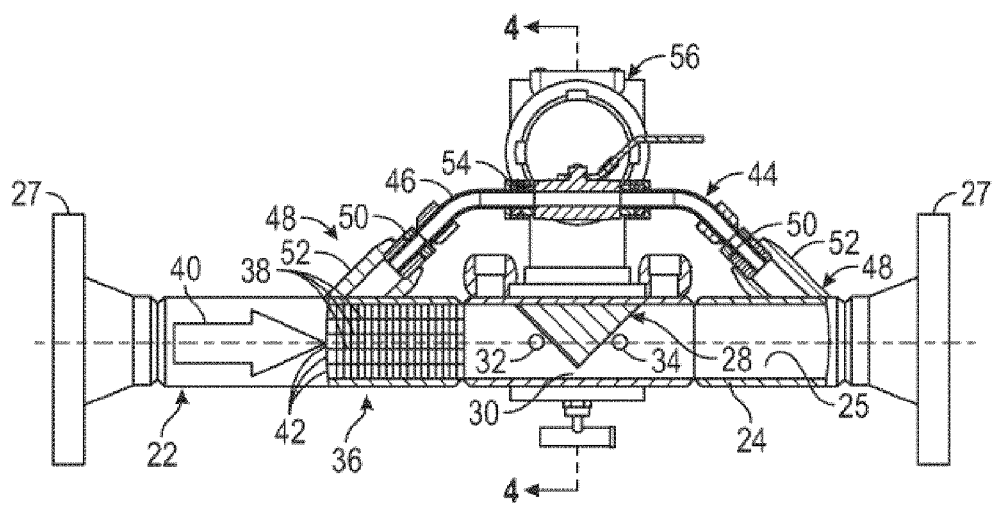
FIG. 2 is a partial cross-sectional view of the gas bypass meter system illustrated in FIG. 1, according to an embodiment of the disclosure.

With additional reference to FIG. 2, the meter 22 further comprises a restriction 28, e.g. a wedge, which extends into the internal flow passage 25 to establish a reduced flow area region 30. For example, the restriction/wedge 28 may extend into internal flow passage 25 from a wall of tubing 24. The meter 22 may further comprise a first port 32 located upstream of the restriction 28 and a second port 34 located downstream of the restriction 28. In some embodiments, a plurality of first ports 32 and/or a plurality of second ports 34 may be used. The ports 32, 34 are formed through the wall of tubing 24 to enable monitoring of the pressure differential between the region upstream of the restriction 28 and the region downstream of the restriction 28.

Figure 3:
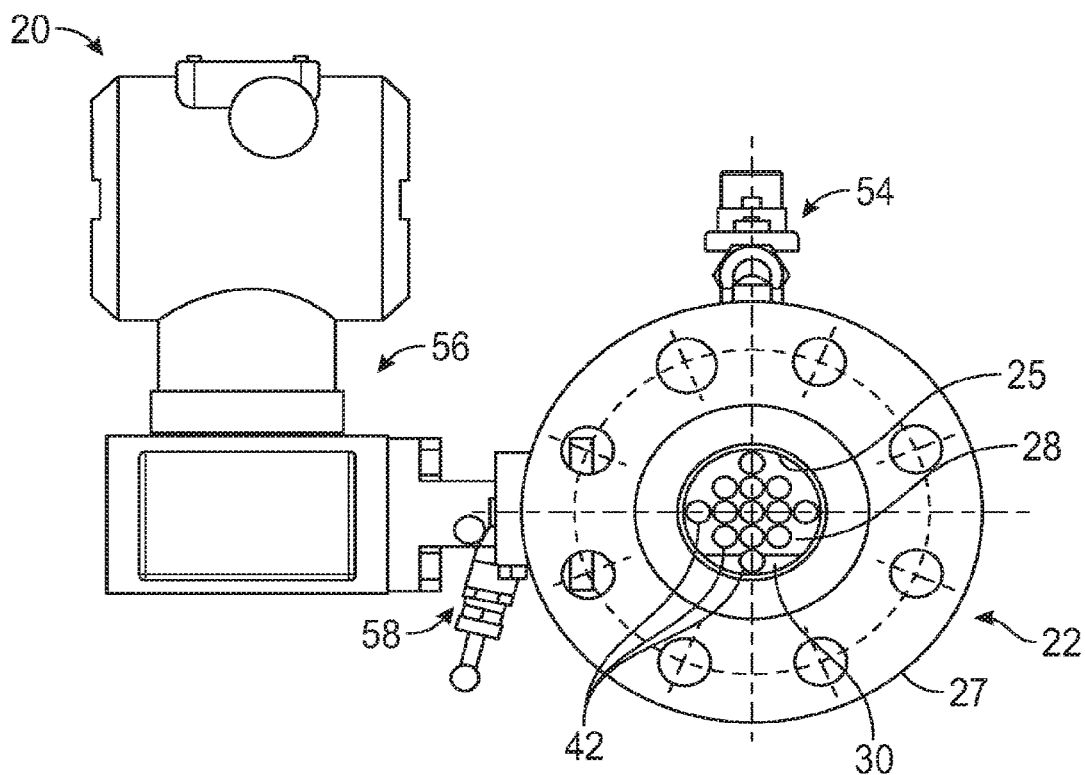
FIG. 3 is a left end view of the gas bypass meter system illustrated in FIG. 1, according to an embodiment of the disclosure.

In the embodiment illustrated, the gas bypass meter system 20 also comprises a gas separating section 36, e.g. a flow straightening section, which may be coupled along tubing 24 at a position upstream of the restriction/wedge 28. By way of example, the flow straightening section 36 may comprise a plurality of flow straightening vanes 38 which serve to straighten a flow of fluid, represented by arrow 40, as the fluid moves through tubing 24. In some applications, the flow straightening vanes 38 may be in the form of perforated tubes 42 stacked side-by-side, as further illustrated in FIG. 3.

The flow straightening section 36 straightens the flow of fluid represented by arrow 40 and also generates a constant flow profile. Additional effects on the fluid flowing through flow straightening section 36 include separation of gas from the liquid portion within fluid flow 40. Following separation, the lighter gas migrates to an upper portion of the tubing 24 which enables removal of the gas from internal flow passage 25 via a gas bypass 44.

In the embodiment illustrated, gas bypass 44 comprises a conduit 46 extending from the flow straightening section 36 and into communication with the internal flow passage 25 downstream of the restriction 28. By way of example, the conduit 46 may be placed in fluid communication with the internal flow passage 25 above and below restriction 28 via a pair of bypass conduit connectors 48 which couple the conduit 46 to tubing 24. The conduit connectors 48 may comprise various types of connectors. By way of example, each connector 48 may comprise a male tube fitting end 50 which is threadably received in a corresponding receptacle 52 welded or otherwise affixed to tubing 24.

Additionally, a valve 54 may be positioned along the gas bypass 44 and may be in the form of a needle valve or other suitable gas flow valve. In the illustrated example, the valve 54 is positioned along conduit 46 and is adjustable to enable control over the gas flow rate along gas bypass 44.

Depending on parameters of a given application, various types of differential pressure monitors 56 may be used to monitor the differential pressure across the restriction/wedge 28. By way of example, the differential pressure monitor 56 may comprise a differential pressure sensor and transmitter for sensing and transmitting the differential pressure data to a suitable processing system, e.g. a computer-based processing system. The processing system may then be used to automatically determine the desired flow parameter, e.g. volumetric flow rate, of the flowing liquid based on standard flow equations, calibration curves, or other suitable correlation/modeling techniques. The differential pressure data provided by monitor 56 also may be compared manually to appropriate calibration curves or other pressure/flow correlation data to estimate the volumetric or mass flow rate of the liquid.

Figure 4:
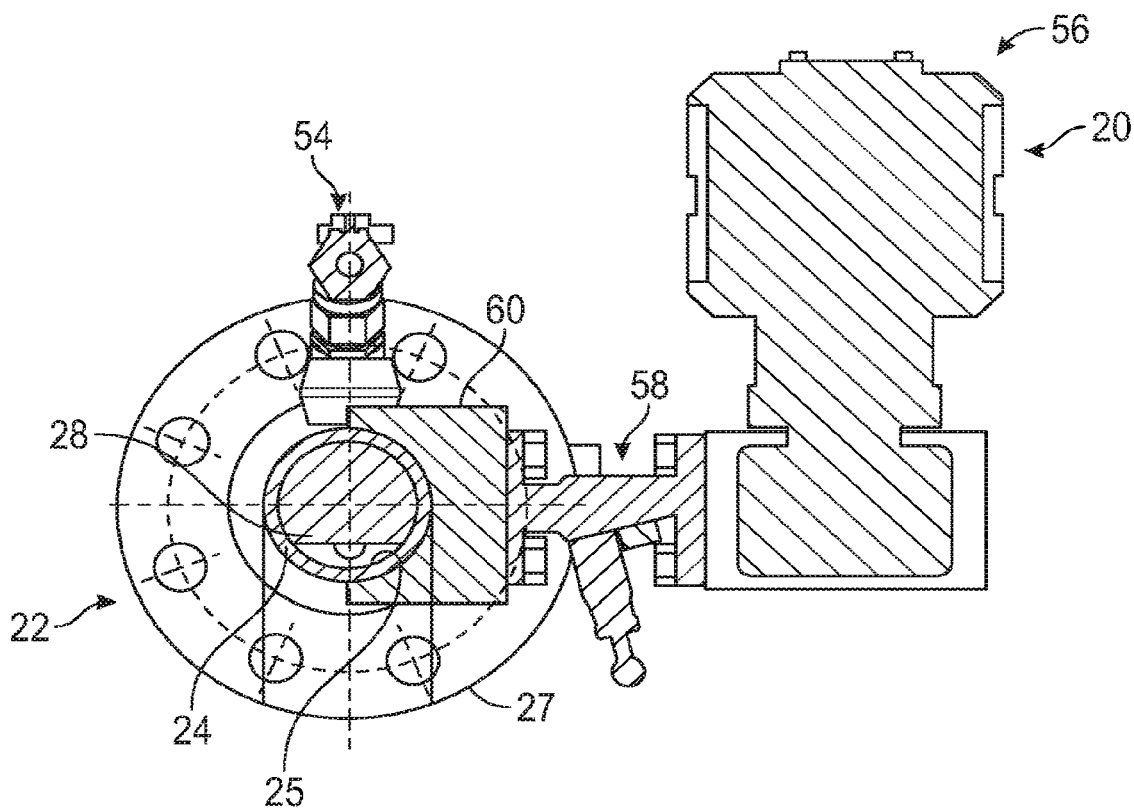
FIG. 4 is a cross-sectional view taken generally along line 4-4 of FIG. 2, according to an embodiment of the disclosure.

With additional reference to FIG. 4, the differential pressure monitor 56 may be placed in fluid communication with first and second ports 32, 34 via appropriate flow conduits, flow manifold, or other suitable flow circuit. In some embodiments, a valve 58, e.g. a three-way valve, may be coupled with tubing 24 via a suitable mounting fixture 60 and placed in fluid communication with the differential pressure monitor 56 as well as with first and second ports 32, 34. The valve 58 may be used as a flow isolation device as well as a device for zeroing the differential pressure monitor 56.

Figure 5:
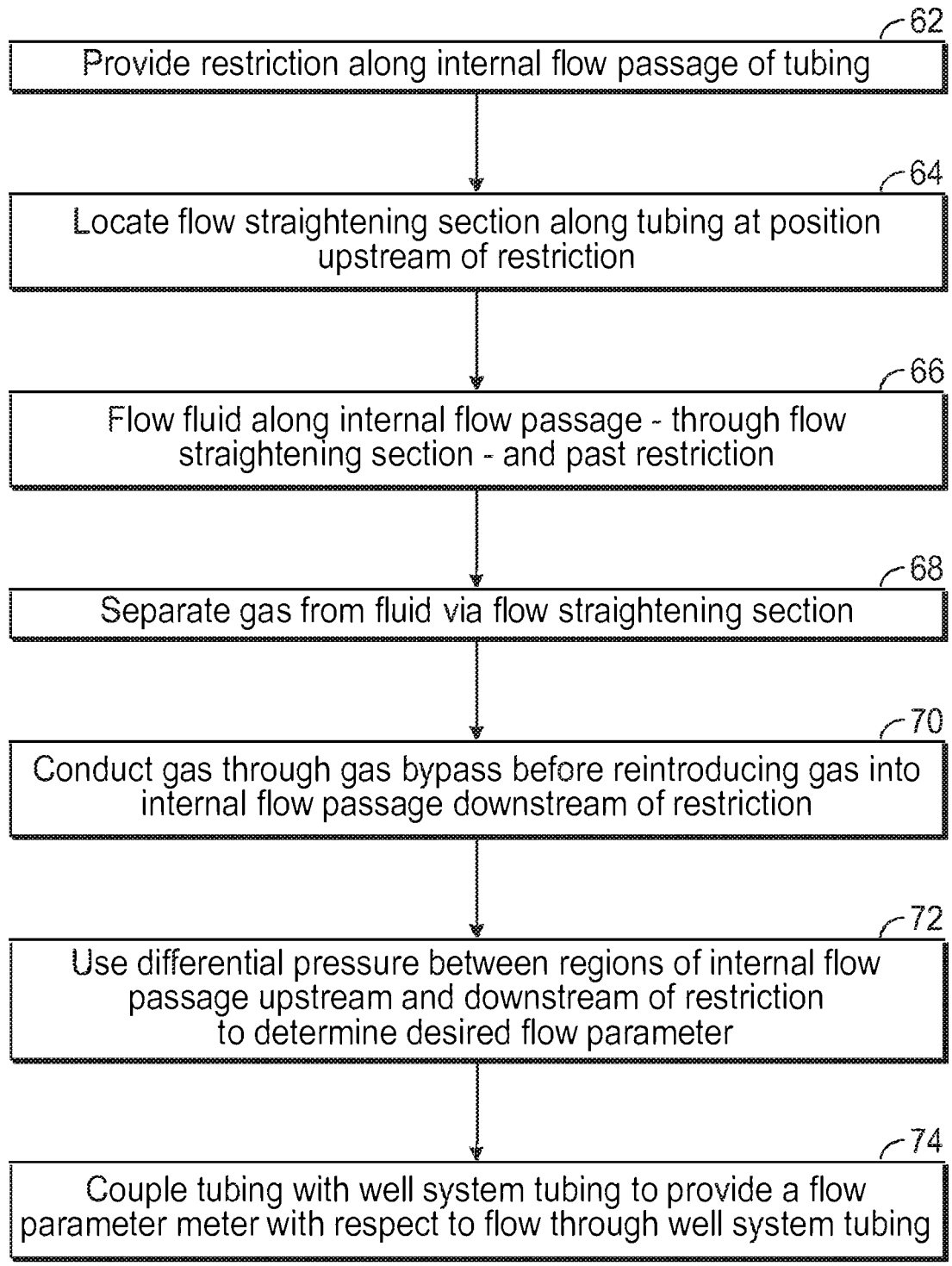
FIG. 5 is a flowchart providing an example of a methodology for implementing a gas bypass meter system, according to an embodiment of the disclosure.

Referring generally to FIG. 5, a flow chart is provided to illustrate a methodology for implementing gas bypass meter system 20. In this operational example, restriction 28 is provided along the internal flow passage 25 of tubing 24, as indicated by block 62. In a variety of embodiments, the restriction 28 may be in the form of wedge 28 as described above.

The flow straightening section 36 is placed along tubing 24 at a position upstream of the restriction 28, as indicated by block 64. Fluid flowing along internal flow passage 25 of tubing 24 is directed through the flow straightening section 36 and past the restriction 28, as indicated by block 66. As the fluid flows through the flow straightening section 36, gas is separated from the fluid, as indicated by block 68.

The gas moves upwardly into the upstream end of gas bypass 44 via the upstream connector 48. The separated gas is then able to move separately through gas bypass 44, e.g. through conduit 46. The separated gas may then be reintroduced into the internal flow passage 25 downstream of the restriction 28, as indicated by block 70. As described above, gas bypass 44 may comprise conduit 46 which is coupled into fluid communication with internal flow passage 25 upstream and downstream of restriction 28 via bypass conduit connectors 48 so as to enable flow of the gas around the restriction 28.

The "lower gas content" fluid/liquid continues to flow past restriction 28 and establishes a differential pressure between regions of the internal flow passage 25 upstream and downstream of restriction 28. This differential pressure can be measured via monitor 56 and used to determine a desired flow parameter, as indicated by block 72. Effectively, tubing 24, restriction 28, flow straightening section 36, and gas bypass 44 cooperatively function to establish a gas bypass meter system 20 able to accurately determine the desired flow parameter, e.g. a volumetric flow rate of the liquid phase of the fluid.

The gas bypass meter system 20 may be used in cooperation with a variety of systems to obtain data on the desired flow parameter as fluid flows through the system. For example, the tubing 24 may be coupled with a well system tubing of well system 26 to provide a flow parameter meter 22 able to measure the desired flow parameter with respect to fluid flow through the well system tubing, as indicated by block 74. At least a portion of the fluid flow moving through the well system tubing (or other system tubing) is able to flow through the tubing 24 so that appropriate well system fluid flow parameter data may be determined via gas bypass meter system 20.

It should be noted the well system tubing may be part of a variety of well systems 26 having corresponding fluid flows. Examples of well systems 26 which may be combined with gas bypass meter system 20 include progressive cavity pumping systems, electric submersible pumping systems, other pumping systems, or various fluid flow control or directing systems. The gas bypass meter system 20 also may be used to measure selected fluid parameters with respect to fluid flows through non-well related systems.

Accordingly, the gas bypass meter system 20 may be used in many types of well applications and also in non-well applications. In a variety of such operations, the gas separating section 36 is a flow straightening section used to smooth the fluid flow thus enabling gas to break out from the liquid. However, other types of gas separating sections 36 may be employed. The gas bypass 44 provides a path for the gas to exit from the internal flow passage 25 of the tubing 24 and to flow around the restriction/wedge 28. By removing the gas, the flow of liquid past restriction 28 establishes a more consistent and accurate differential pressure which can be monitored and transmitted via differential pressure monitor 56. Consequently, reliable differential pressure data is available to provide accurate monitoring of liquid flow 40 through meter 22.

Depending on the specific usage of gas bypass meter system 20, the components and features of the gas bypass meter system 20 may be adjusted. For example, various types of differential pressure monitors 56 may be used to measure and utilize the differential pressure established on upstream and downstream sides of the restriction 28. Additionally, the gas bypass 44 may comprise tubing or a variety of other conduits, e.g. passages, for directing the gas around the restriction 28. The restriction 28 may be formed as a wedge extending internally from the wall forming tubing 24, or the restriction 28 may have other suitable shapes and configurations. The restriction 28 is constructed to create the desired differential pressure as the liquid (lower gas fluid) moves past the restriction. The size, shape, and materials of the various components of gas bypass meter system 20 may be selected according to the characteristics of a given system and/or environment.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for monitoring flow, comprising:
    a wedge meter having a tubing with an internal flow passage, a wedge extending into the internal flow passage from an inner wall of the tubing, a first port upstream of the wedge, and a second port downstream of the wedge;
    a flow straightener section having a first end and a second end coupled along the tubing at a location upstream of the wedge, wherein the flow straightener section comprises a plurality of flow straightening vanes extending from the first end of the flow straightener section to the second end of the flow straightener section and oriented to straighten a flow of a fluid and to generate a constant flow profile for the fluid as the fluid flows through the plurality of flow straightening vanes; and
    a gas bypass having a conduit having a first end and a second end, wherein the first end of the conduit extends from and overlaps with an upper portion of the first end of the flow straightener section at a location adjacent to the plurality of flow straightening vanes; and
    wherein the second end of the conduit extends into communication with the internal flow passage downstream of the wedge.

2. The system as recited in claim 1, further comprising a pressure differential monitor coupled with the first port and the second port, wherein the first end is adjacent an upstream edge of the upper portion on a top surface of the tubing, wherein the first end interfaces with the upper portion at the top surface the first end of the flow straightener section, and an entire orifice associated with the first end overlaps the upper portion.

3. The system as recited in claim 1, wherein the gas bypass comprises a valve which may be adjusted to control gas flow, wherein the valve comprises a needle valve.

4. The system as recited in claim 1, wherein a plurality of flow straightening vanes are oriented to facilitate release of gas from the fluid as the fluid flows through the plurality of flow straightening vanes.

5. The system as recited in claim 1, wherein the plurality of flow straightening vanes comprises a plurality of perforated tubes.

6. The system as recited in claim 1, wherein the conduit of the gas bypass is connected to the tubing via a pair of bypass connectors, and wherein the location is nearer a downstream end of the flow straightener section than an upstream end of the flow straightener section.

7. A system for monitoring flow, comprising:
    a meter having a tubing with an internal flow passage, a restriction located in the internal flow passage, a first port upstream of the restriction, and a second port downstream of the restriction, wherein the restriction extends into the internal flow passage from an inner wall of the tubing;
    a flow straightener section having a first end and a second end coupled along the tubing at a location upstream of the restriction, wherein the flow straightener section comprises a plurality of flow straightening vanes extending from the first end of the flow straightener section to the second end of the flow straightener section and oriented to straighten a flow of a fluid and to generate a constant flow profile for the fluid as the fluid flows through the plurality of flow straightening vanes; and
    a gas bypass positioned to receive gas separated from a fluid flowing through the flow straightener section, the gas bypass comprising a conduit having a first end and a second end, wherein the first end of the conduit extends from and overlaps with an upper portion of the first end of the flow straightener section at a location adjacent to the plurality of flow straightening vanes; and
    wherein the second end of the conduit extends into communication with the internal flow passage downstream of the restriction.

8. The system as recited in claim 7, wherein the restriction is in the form of a wedge extending into the internal flow passage from a wall of the tubing.

9. The system as recited in claim 7, wherein gas flow along the gas bypass is controlled via a bypass valve.

10. The system as recited in claim 7, further comprising a pressure differential monitor coupled with the first port and the second port.

11. The system as recited in claim 7, wherein the plurality of flow straightening vanes are oriented to facilitate release of gas from the fluid as the fluid flows through the plurality of flow straightening vanes and wherein the location is nearer a downstream end of the flow straightener section than an upstream end of the flow straightener section.

12. The system as recited in claim 7, wherein the plurality of flow straightening vanes comprises a plurality of perforated tubes.

13. The system as recited in claim 7, wherein the meter is coupled with a well system tubing.

14. A method for monitoring flow, comprising:
providing a restriction along an internal flow passage of a tubing;
locating a gas separation section having a first end and a second end along the tubing at a position upstream of the restriction, wherein the gas separation section comprises a plurality of flow straightening vanes extending from the first end of the gas separation section to the second end of the gas separation section and oriented to straighten a flow of a fluid and to generate a constant flow profile for the fluid as the fluid moves through the gas separation section;
flowing a fluid along the internal flow passage through the gas separation section and then past the restriction;
conducting gas, separated from the fluid at the gas separation section, along a gas bypass before reintroducing the gas back into the internal flow passage downstream of the restriction, wherein the gas bypass comprises a conduit having a first end and a second end, wherein the first end of the conduit extends from and overlaps with an upper portion of the first end of the gas separation section at a location adjacent to the plurality of flow straightening vanes; and
wherein the second end of the conduit extends into communication with the internal flow passage downstream of the restriction; and using a differential pressure between regions of the internal flow passage upstream and downstream of the restriction to determine a desired flow parameter of the fluid.

15. The method as recited in claim 14, wherein providing comprises providing the restriction in the form of a wedge extending into the internal flow passage from a wall of the tubing.

16. The method as recited in claim 14, wherein conducting gas comprises controlling gas flow along the gas bypass via a bypass valve and wherein the location is nearer a downstream end of the flow straightening vanes than an upstream end of the flow straightening vanes and wherein the bypass valve is a needle valve.

17. The method as recited in claim 14, wherein flowing the fluid through the gas separation section comprises flowing the fluid through the plurality of flow straightening vanes oriented to facilitate release of gas as the fluid moves through the gas separation section.

18. The method as recited in claim 14, wherein the plurality of flow straightening vanes comprise a plurality of perforated tubes.

19. The method as recited in claim 14, further comprising coupling a pressure differential monitor with a first tubing port located upstream of the restriction and with a second tubing port located downstream of the restriction.

20. The method as recited in claim 14, further comprising coupling the tubing with a well system tubing so the gas separation section, restriction, and gas bypass are able to function as a meter for monitoring a flow parameter with respect to flow through the well system tubing.

* * * * *